(12) United States Patent
Shoji

(10) Patent No.: US 8,051,820 B2
(45) Date of Patent: Nov. 8, 2011

(54) CAM CAP AND OIL PASSAGE CONNECTION STRUCTURE

(75) Inventor: Junpei Shoji, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 394 days.

(21) Appl. No.: 12/438,815

(22) PCT Filed: Sep. 4, 2007

(86) PCT No.: PCT/IB2007/002544
§ 371 (c)(1),
(2), (4) Date: Feb. 25, 2009

(87) PCT Pub. No.: WO2008/029247
PCT Pub. Date: Mar. 13, 2008

(65) Prior Publication Data
US 2010/0012063 A1    Jan. 21, 2010

(30) Foreign Application Priority Data
Sep. 4, 2006 (JP) .................................. 2006-238910

(51) Int. Cl.
*F01M 1/06* (2006.01)
(52) U.S. Cl. ............... 123/90.33; 123/90.34; 123/90.38; 277/591
(58) Field of Classification Search ............... 123/90.33, 123/90.34, 90.38; 277/591
See application file for complete search history.

(56) References Cited

U.S. PATENT DOCUMENTS

| | | | |
|---|---|---|---|
| 5,664,789 A * | 9/1997 | Hayashi | 277/345 |
| 6,684,836 B2 * | 2/2004 | Inoue | 123/90.17 |
| 2004/0020456 A1 | 2/2004 | Katayama | |
| 2006/0011158 A1 | 1/2006 | Yoshijima et al. | |

FOREIGN PATENT DOCUMENTS

| | | |
|---|---|---|
| DE | 101 02 767 A1 | 7/2002 |
| EP | 1 316 682 A2 | 6/2003 |
| JP | 08-93942 A | 4/1996 |
| JP | 2542525 Y2 | 4/1997 |
| JP | 2003-35125 A | 2/2003 |
| JP | 2003-148622 A | 5/2003 |
| JP | 2003-222003 A | 8/2003 |
| JP | 2003-227321 A | 8/2003 |
| JP | 2004-92567 A | 3/2004 |
| JP | 2005-42657 A | 2/2005 |
| JP | 2005-265103 A | 9/2005 |

OTHER PUBLICATIONS

Journal of Technical Disclosure, JP-2002-2598, Jun. 3, 2002.

* cited by examiner

*Primary Examiner* — Ching Chang
(74) *Attorney, Agent, or Firm* — Sughrue Mion, PLLC

(57) ABSTRACT

A gasket provided in a gasket groove, receives the force that acts in the direction in which two pressure-adjusting oil passages are aligned in line, and the magnitude and direction of this force change as the difference between the hydraulic pressures in the pressure-adjusting oil passages varies. However, because the opening of a hydraulic oil supply passage is located on an imaginary line extending through between the openings of the two pressure-adjusting oil passages, pressure is applied from the hydraulic oil supply passage to the gasket, whereby constant and large frictional force occurs between the gasket and the side wall of the gasket groove. Thus, the gasket is firmly retained in the gasket groove, whereby the vibration of the gasket is suppressed.

7 Claims, 9 Drawing Sheets

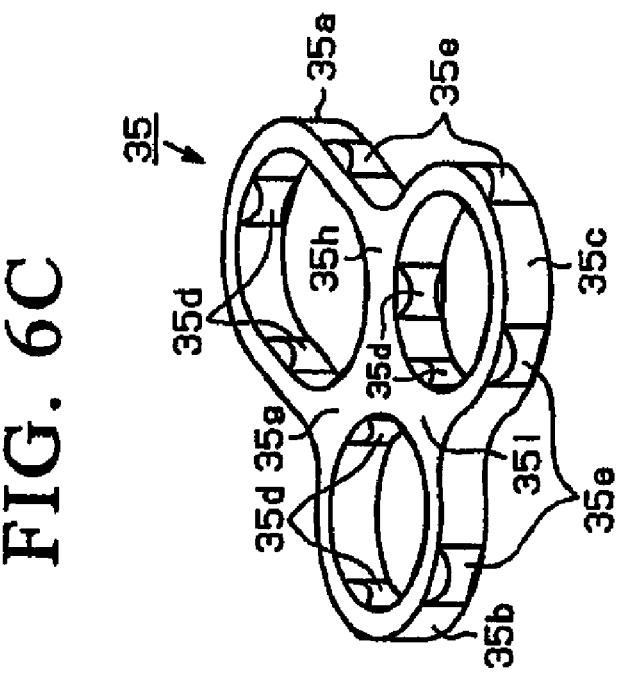
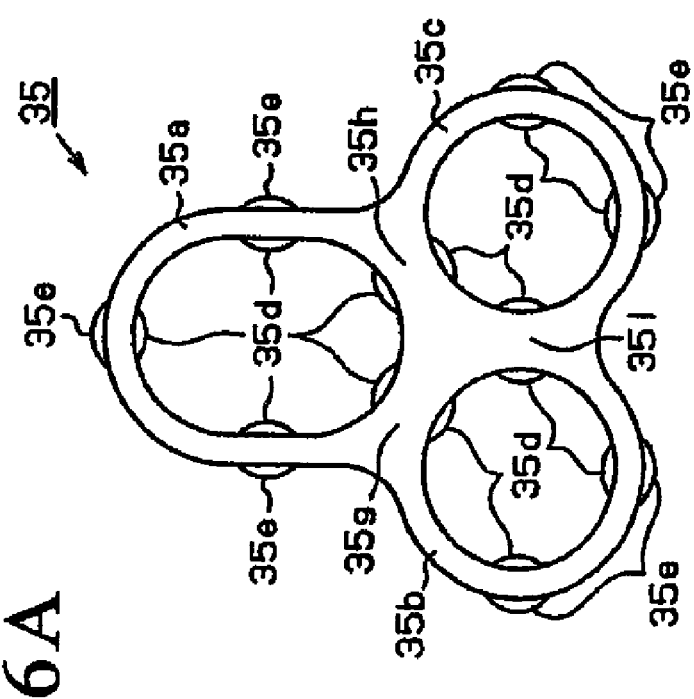
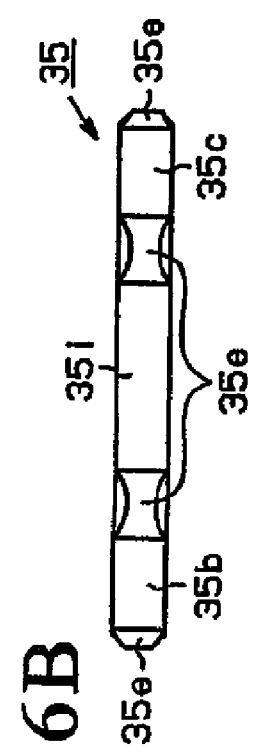

CAM CAP AND OIL PASSAGE CONNECTION STRUCTURE

BACKGROUND OF THE INVENTION

1. Field of the Invention

The invention relates to a cam cap for an internal combustion engine and an oil passage connection structure of a cam cap for establishing an oil passage connection with a cylinder head cover.

2. Description of the Related Art

Japanese Patent Application Publication No. 2003-227321 (JP-A-2003-227321) proposes a cam cap (called "cam bracket" in the publication) having an intake side cam cap portion and an exhaust side cam cap portion that are integrally formed to support the intake camshaft and the exhaust camshaft of an internal combustion engine on journal bearings formed on the cylinder head or the cam housing, respectively. This cam cap involves oil passages through which hydraulic oil is supplied to and drained from a single oil control valve (called "hydraulic pressure control valve" in the publication) provided in the cylinder head cover, and hydraulic oil is supplied, at a pressure adjusted by the oil control valve, to only one of the camshafts. More specifically, the pressure-adjusted hydraulic oil is supplied to a variable valve timing mechanism provided at one end of one of the camshafts to adjust the operation timing of the exhaust valves or the intake valves as needed. Note that, in the specification of the present invention, the phrase "pressure adjusting" includes starting and stopping the application of hydraulic pressure, as well as adjusting the hydraulic pressure level.

According to Japanese Patent Application Publication No. 2003-227321, the joint between the oil passage connection face of the cam cap and the oil passage connection face of the cylinder head cover is sealed by a gasket that serves also as an oil filter. Thus, the gasket is retained in position by being sandwiched between the flat oil passage connection face of the cam cap and the flat oil passage connection face of the cylinder head cover.

When using such a gasket used also as an oil filter, however, it is necessary to provide a locating post on the oil passage connection faces as described in Japanese Patent Application Publication No. 2003-227321. Thus, the outline of each oil passage connection face becomes complicated and large in size.

To avoid such a problem, one option is to provide a separate oil filter and form a gasket groove in the oil passage connection face and fit a gasket in the gasket groove. In this case, the respective parts can be located in their positions by simply fitting a gasket in the gasket groove and the shape of the structure around the oil passage connection face does not become complicated and large in size.

However, the difference between the hydraulic pressure in one of two pressure-adjusting oil passages and the hydraulic pressure in the other varies as the valve timing control by the oil control valve is repeatedly switched between the mode for advancing the valve timing and the mode for retarding the valve timing and as the operation for the valve timing control is repeatedly activated and stopped. This hydraulic pressure difference may cause the gasket to slide in the gasket groove, and it may cause wear of the gasket.

SUMMARY OF THE INVENTION

It is an object of the invention to suppress the vibration of a gasket provided in a gasket groove formed in an oil passage connection face, which may occur as the hydraulic pressure difference between pressure-adjusting oil passages varies.

A first aspect of the invention relates to a cam cap for an internal combustion engine, having a connection portion protruding from a side of the cam cap opposite to where a camshaft support face is formed and having an oil passage connection face that is mated, in order to establish an oil passage connection, to a corresponding oil passage connection face formed at a cylinder head cover in which an oil control valve is provided. In this cam cap, the opening of a hydraulic oil supply passage through which hydraulic oil is supplied to the oil control valve and the openings of two pressure-adjusting oil passages each of which supplies and receives hydraulic oil at a pressure adjusted by the oil control valve are formed in the oil passage connection face of the connection portion such that the opening of the hydraulic oil supply passage is located on an imaginary line extending through between the openings of the two pressure-adjusting oil passages. Further, a gasket groove is formed as a single continuous groove in the oil passage connection face of the connection portion so as to surround the opening of the hydraulic oil supply passage and the openings of the two pressure-adjusting oil passages.

When a gasket is in the gasket groove, the gasket receives the vibrating force that occurs as the hydraulic pressure difference between the two pressure-adjusting oil passages varies. This vibrating force arts in the direction in which the openings of the two pressure-adjusting passages are aligned in line. However, in the above-described structure, because the opening of the hydraulic oil supply passage that is the hydraulic pressure source for the pressure-adjusting control by the oil control valve is located on the imaginary line extending through between the openings of the two pressure-adjusting oil passages, the effect of the hydraulic pressure in the hydraulic oil supply passage on the gasket is strongest and stable.

Therefore, the gasket is constantly pressed against the portions of the side faces of the gasket groove each facing the opening of the hydraulic oil supply passage under the pressure exerted from the hydraulic oil supply passage in the direction substantially perpendicular to the direction in which the openings of the pressure-adjusting oil passages are aligned in line. As such, constant and large frictional force occurs between the gasket and the aforementioned side faces of the gasket groove, whereby the gasket is firmly retained in the gasket groove. This structure suppresses the vibration of the gasket in the gasket groove that occurs as the hydraulic pressure difference between the pressure-adjusting oil passages varies. Thus, wear of the gasket can be minimized.

The above-described cam cap may be such that the gasket groove is constituted of annular grooves surrounding the opening of the hydraulic oil supply passage and the openings of the two pressure-adjusting oil passages, respectively, the annular grooves being integrated into a single continuous groove by each of arc portions of the respective annular grooves being shared by two adjacent annular grooves.

According to this structure, force can be more steadily transferred from the portion of the gasket surrounding the opening of the hydraulic oil supply passage to other portions of the gasket, whereby the gasket is more firmly retained and therefore the effect of suppressing the vibration of the gasket is further enhanced.

Further, the above-described cam cap may be such that, in the oil passage connection face of the connection portion, the center of the opening of the hydraulic oil supply passage is located on an imaginary line extending through the midpoint between the openings of the two pressure-adjusting oil passages, and the layout of the opening of the hydraulic oil supply passage and the openings of the two pressure-adjusting oil passages and the shape of the gasket groove are symmetrical with respect to a plane extending through the imaginary line in a direction perpendicular to the oil passage connection face.

By arranging the opening of the hydraulic oil supply passage and the openings of the pressure-adjusting oil passages as described above, the transfer of force from the portion of the gasket surrounding the opening of the hydraulic oil passage to other portions of the gasket is made more uniform and steady, whereby the effect of suppressing the vibration of the gasket is further enhanced.

Further, the above-described cam cap may be such that the cam cap has a cam cap portion for an intake camshaft and a cam cap portion for an exhaust camshaft and each of the cam cap portions has the connection portion.

Because the structure around the oil passage connection face of the cam cap according to the invention is not complicated and large in size, even if the cam cap portion for the intake camshaft and the cam cap portion for the exhaust camshaft are integrated, the two connection portions can be easily formed on the cam cap portions 4, 6, respectively, at positions adjacent to each other. At each connection portion thus formed, as described above, the vibration of the gasket that occurs as the hydraulic pressure difference between the pressure-adjusting oil passages varies can be suppressed.

Another aspect of the invention relates to an oil passage connection structure having: one of the cam caps described above; a gasket that is integrally formed in a shape corresponding to the shape of the gasket groove and arranged in the gasket grove so as to surround the opening of the hydraulic oil supply passage and the openings of the two pressure-adjusting oil passages; and a cylinder-head-cover-side oil passage connection face formed at the cylinder head cover and mated, in order to establish an oil passage connection, to the oil passage connection face of the connection portion of the cam cap.

This oil passage connection structure incorporating one of the foregoing cam caps suppresses the vibration of the gasket that occurs as the hydraulic pressure difference between the pressure-adjusting passages varies. Thus, wear of the gasket can be minimized.

In the above oil passage connection structure, the cylinder-head-cover-side oil passage connection face may be flat. Because the gasket groove is formed in the oil passage connection face of the cam cap, the oil passage connection face of the cylinder head cover may be flat. If a gasket groove is formed in the cylinder-head-cover-side oil passage connection face, a need may arise to machine the cylinder-head-cover-side oil passage connection face so as to achieve sufficient positional accuracy and flatness of the cylinder-head-cover-side oil passage connection face. In this case, the depth of the gasket groove formed in the cylinder-head-cover-side oil passage connection face tends to be insufficient or non-uniform. Especially, because the entire part of the cylinder head cover is thin, the cylinder head cover tends to deform when it is manufactured by injection molding, or the like. As such, the finishing process for the gasket groove in the cylinder-head-cover-side oil passage connection face is likely to end up with insufficient or non-uniform depth of the gasket groove, reducing the manufacturing yields.

On the other hand, being small in size and having a relatively large thickness, the cam cap is unlikely to deform when it is manufactured by casting, or the like. Therefore, the desired depth and shape of the gasket groove of the cam cap can be maintained even after finishing the oil passage connection face of the cam cap. Further, the cam cap may be finished by using the oil passage connection faces as a reference plane. In this case, the depth of the gasket grooves is not influenced by the finishing process.

As such, it is possible to more effectively suppress the vibration of the gasket and thus minimize wear of the gasket as well as improving the manufacturing yields.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 6A, FIG. 6B FIG. 6C are views showing the shape of the gasket of the first exemplary embodiment;

DETAILED DESCRIPTION OF THE EMBODIMENTS

First Exemplary Embodiment

Figure 1A:
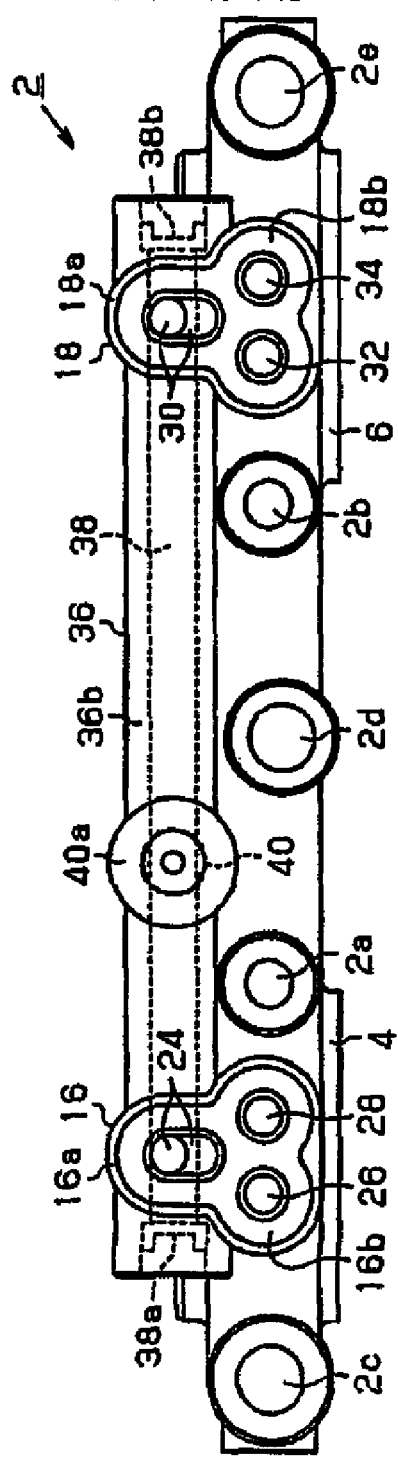
FIG. 1A is a view showing the top side of a cam cap according to the first exemplary embodiment of the invention and FIG. 1B is a view showing the front side of the cam cap according to the first exemplary embodiment.
Figure 1B:
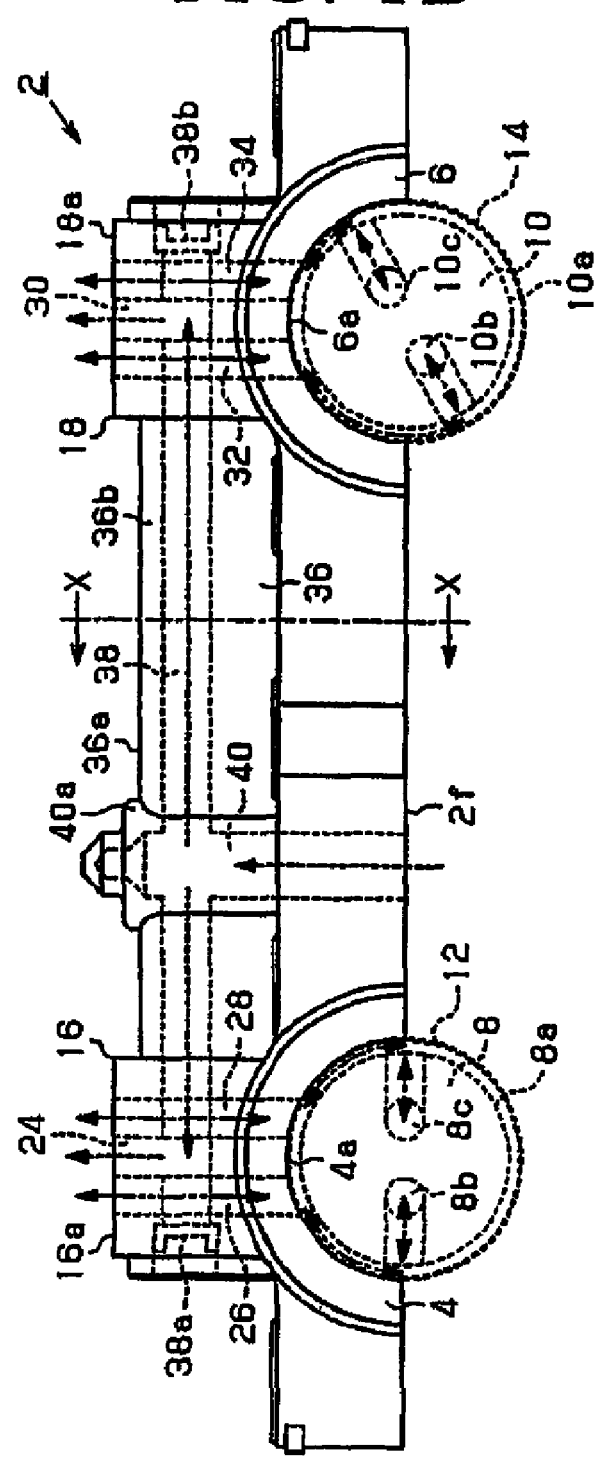
Figure 2A:
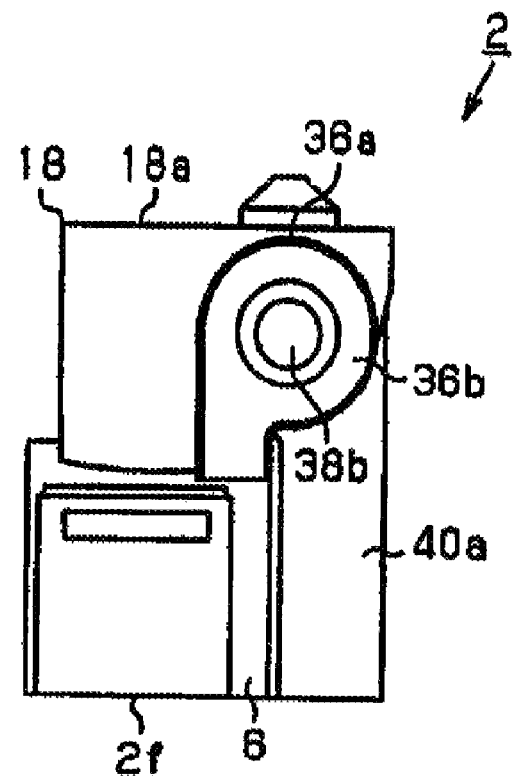
FIG. 2A is a view showing the right side of the cam cap according to the first exemplary embodiment and FIG. 2B is a cross-sectional view taken along the line X-X indicated in FIG. 1B.
Figure 2B:
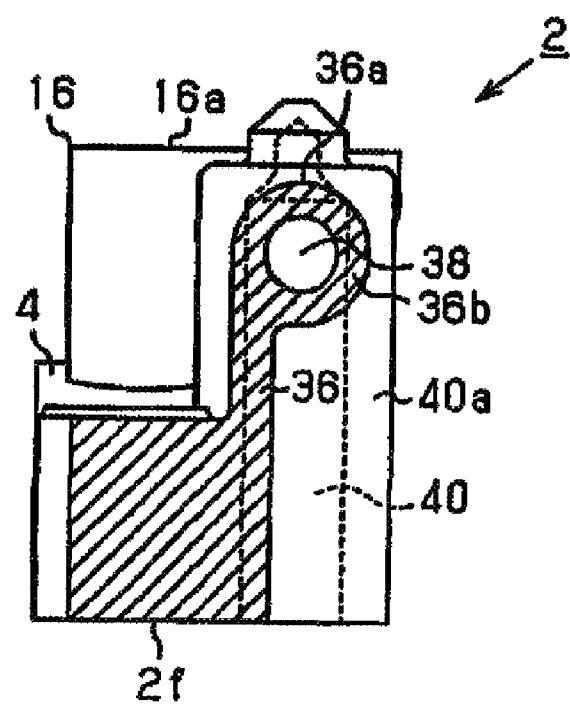
Figure 3:
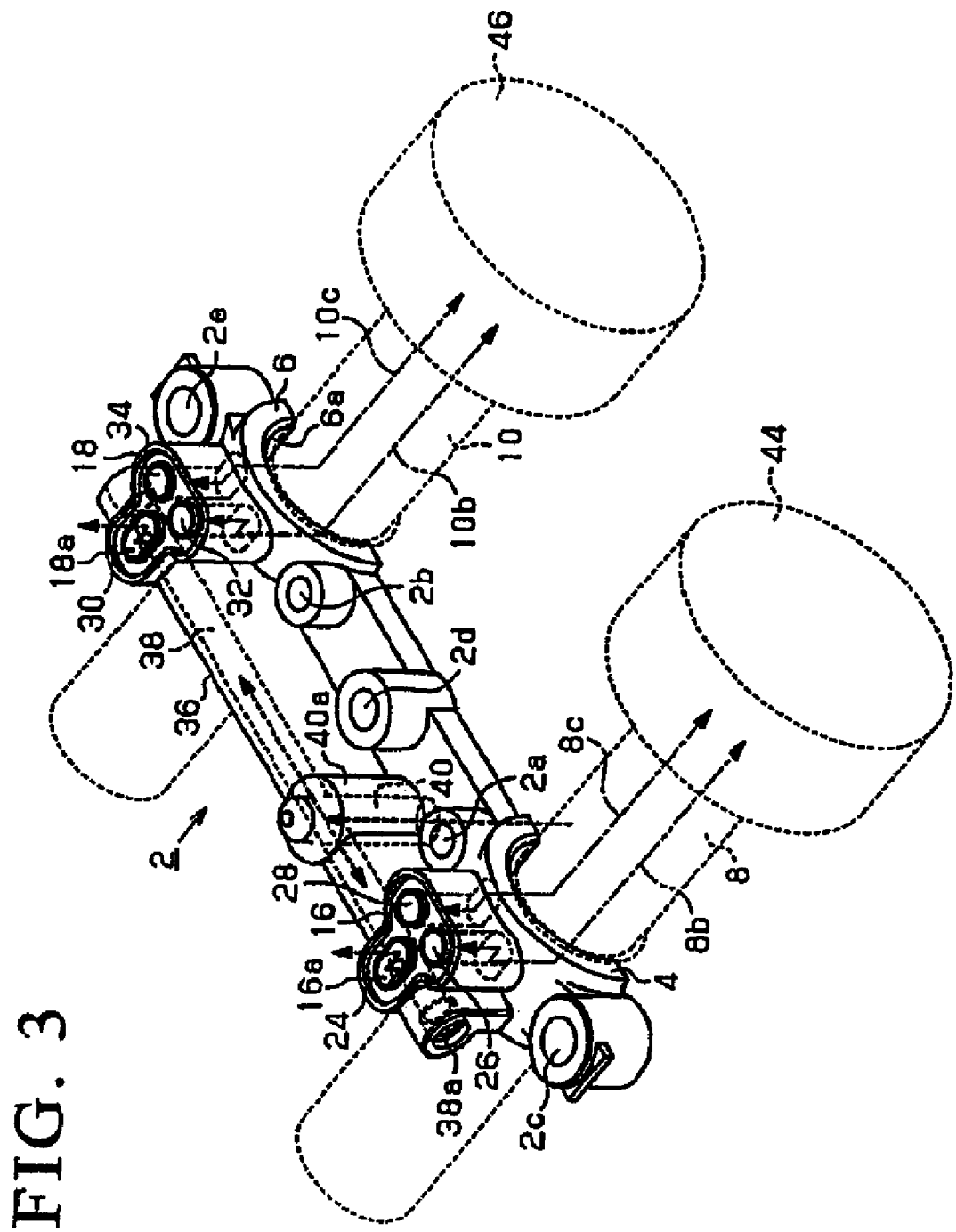
FIG. 3 is a perspective view of the cam cap according to the first exemplary embodiment.
Figure 4:
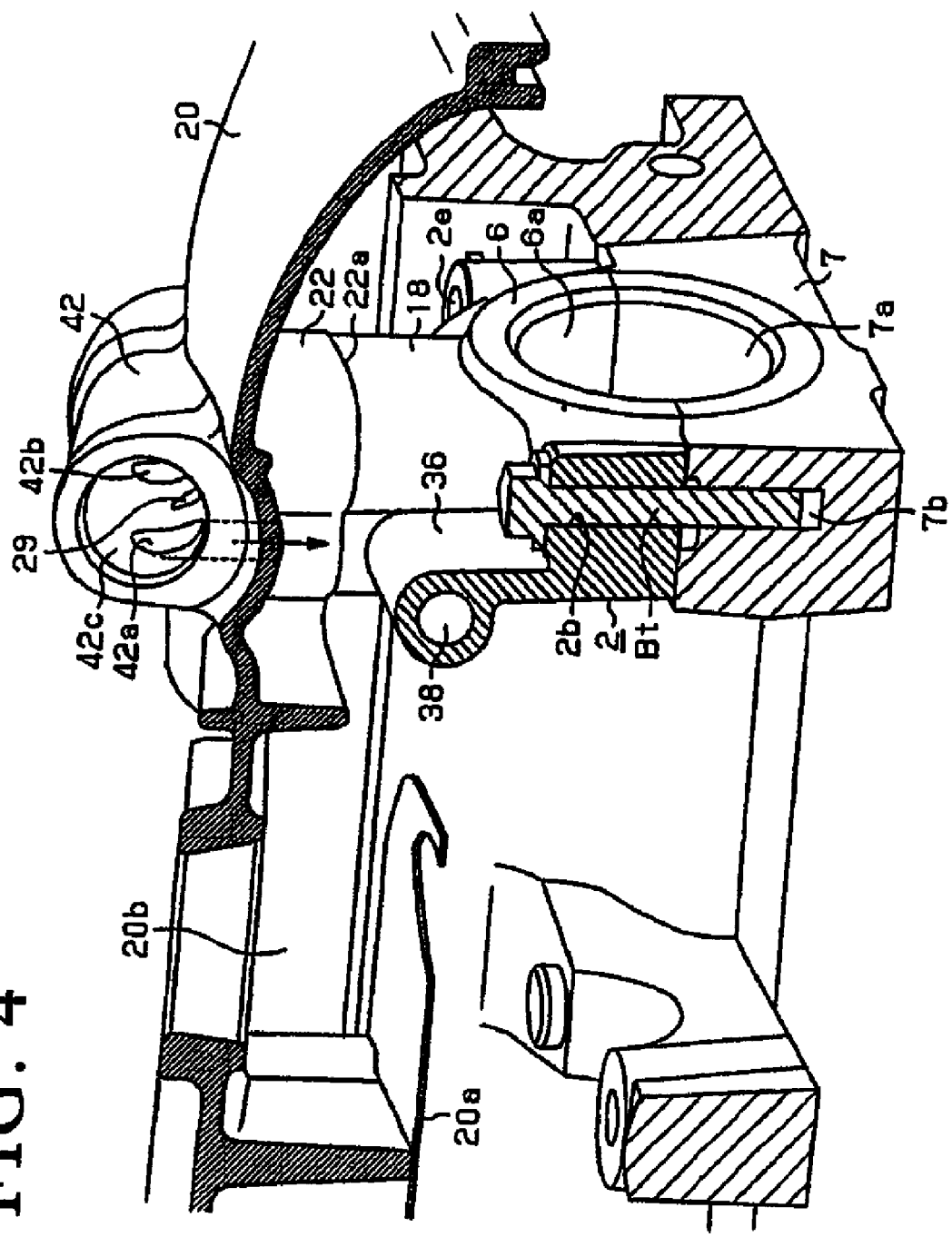
FIG. 4 is a perspective cutaway view of the cam cap according to the first exemplary embodiment when it is mounted on an internal combustion engine.

FIG. 1A is a view showing the top side of a cam cap 2 according to the first exemplary embodiment of the invention, and FIG. 1B is a view showing the front side of the cam cap 2. FIG. 2A is a view showing the right side of the cam cap 2 as viewed in FIG. 1A. FIG. 2B is a cross-sectional view taken along the line X-X indicated in FIG. 1B. FIG. 3 is a perspective view of the cam cap 2. FIG. 4 is a perspective cutaway view showing the main portion of the cam cap 2 mounted on in an internal combustion engine.

The cam cap 2 is formed by grinding a casting of metal (e.g., aluminum). The cam cap 2 has an exhaust side cam cap portion 4 (the portion on the left in FIG. 1) and an intake side cam cap portion 6 (the portion on the right in FIG. 1), which are integrated with each other. The exhaust side cam cap portion 4 has a camshaft support face 4a having a semi-cylindrical outline, and the intake side cam cap portion 6 has a camshaft support face 6a having a semi-cylindrical outline. When the cam cap 2 is bolted on a cam housing 7 (or directly on the cylinder head of the internal combustion engine), as shown in FIG. 3, an exhaust camshaft 8 is rotatably supported between the camshaft support face 4a and a camshaft support face 7a formed at the cam housing 7, and an intake camshaft 10 is rotatably supported between the camshaft support face 6a and another camshaft support face 7a formed at the cam housing 7. The cam cap 2 is secured to the cam housing 7 by inserting bolts Bt into bolt insert holes 2a, 2b of the cam cap 2 and then fastening them into threaded holes 7b of the cam housing 7. The cam cap 2 has three other bolt insert holes 2c, 2d, 2e and the cam housing 7 has three bolt insert holes formed at positions corresponding the bolt insert holes 2c, 2d, 2e, respectively. The cam cap 2 and the cam housing 7 are together secured to the cylinder head by inserting bolts into the bolt insert holes 2c, 2d, 2e of the cam cap 2 and then into the corresponding three bolt insert holes of the cam housing 7 and then fastening the bolts into corresponding threaded holes formed in the cylinder head. When the cam cap 2 is mounted, a plain bearing 12 made of metal is put between the exhaust camshaft 8 and the shaft support faces 4a, 7a and a plain bearing 14 made of metal is put between the intake camshaft 10 and the shaft support faces 6a, 7a.

Connection portions 16, 18 are formed at the exhaust side cam cap portion 4 and the intake side cam cap portion 6, respectively. The connection portions 16, 18 protrude from the sides opposite from where the camshaft support faces 4a, 6a are formed, respectively. Oil passage connection faces 16a, 18a are provided at the upper ends of the connection portions 16, 18. The connection portions 16, 18 are connected to the corresponding connection portions 22 of a cylinder head cover 20 shown in FIG. 4. That is, the oil passage connection faces 16a, 18a of the connection portions 16, 18 are connected to cylinder-head-cover-side oil passage connection faces 22a formed at the lower ends of connection portions 22 protruding downward from the bottom side of the cylinder head cover 20.

Figure 5A:
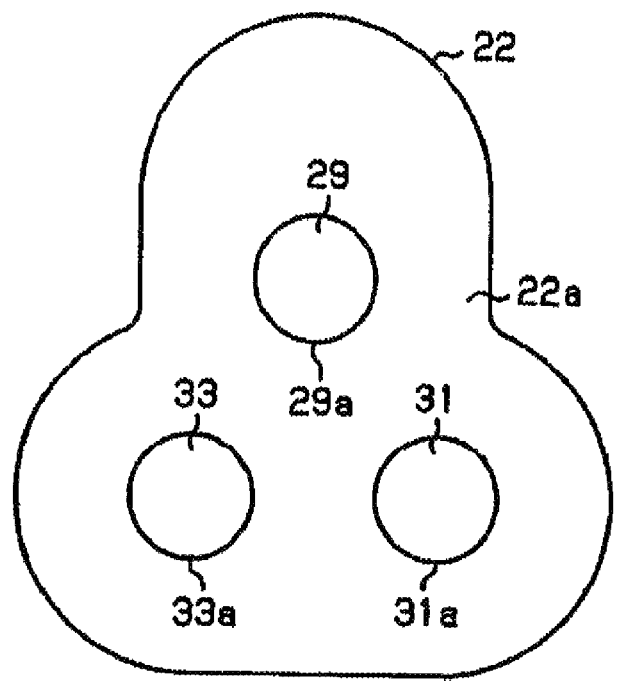
FIG. 5A and FIG. 5B are views showing the shape of the oil passage connection face of the first exemplary embodiment.
Figure 5B:
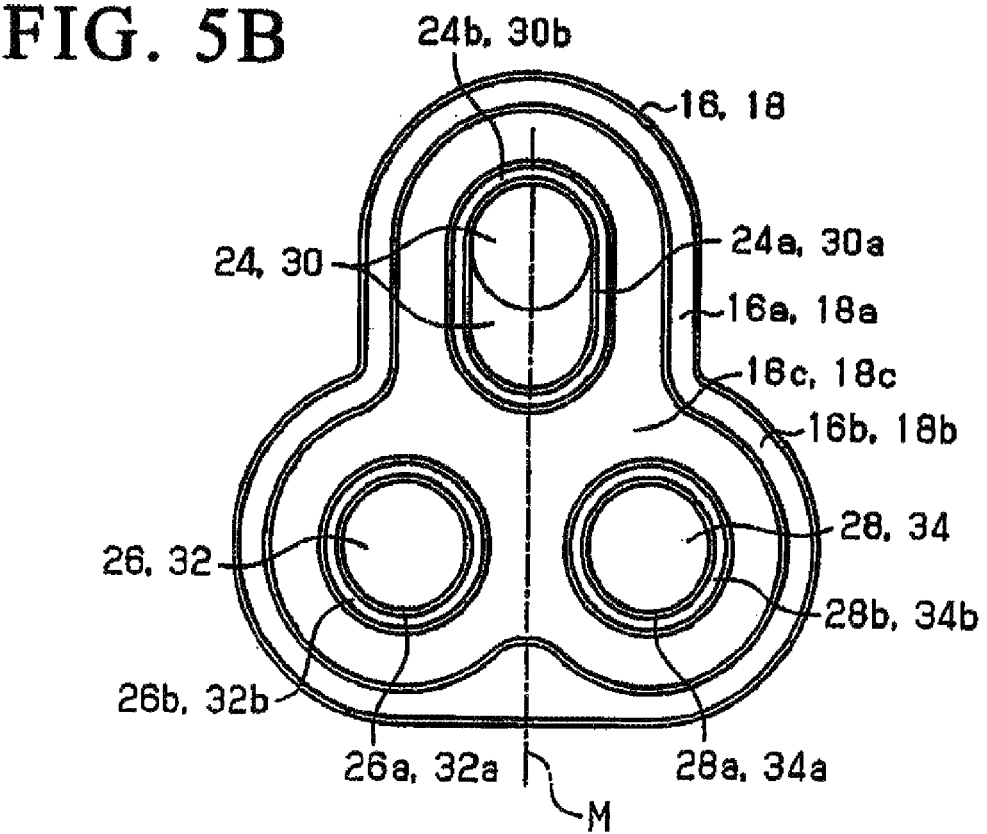

FIG. 5A shows the shape of each cylinder-head-cover-side oil passage connection face 22a, and FIG. 5B shows the shape of each of the oil passage connection faces 16a, 18a of the connection portions 16, 18 of the cam cap portions 4, 6. Although the cylinder-head-cover-side oil passage connection face 22a is slightly larger in size than the oil passage connection face 16a, 18a, the shape of the cylinder-head-cover-side oil passage connection face 22a and the shape of the oil passage connection face 16a, 18a are substantially the same as each other.

The cylinder-head-cover-side oil passage connection face 22a of each connection portion 22 of the cylinder head cover 20 is completely flat except where three openings 29a, 31a, 33a are formed. On the other hand, the oil passage connection faces 16a, 18a on the cam cap 2 side are formed such that peripheral edges 24b, 26b, 28b, 30b, 32b, 34b of openings 24a, 26a, 28a, 30a, 32a, 34a and peripheral edges 16b, 18b of the oil passage connection faces 16a, 18a are formed in the shape of "bank" by being raised upward with respect to other portions, whereby gasket grooves 16c, 18c are formed in the oil passage connection faces 16a, 18a. As shown in FIG. 6, a gasket 35 made of a rubbery elastic material and having a shape surrounding the openings 24a, 26a, 28a of the oil passages 24, 26, 28 is put in the gasket groove 16c, and another gasket 35 having a shape surrounding the openings 30a, 32a, 34a of the oil passages 30, 32, 34 is put in the gasket groove 18c. FIG. 6A is a view showing the top side of the gasket 35, FIG. 6B is a view showing the front side of the gasket 35, and FIG. 6C is a perspective view of the gasket 35. The gasket groove 16c (18c) consists of three annular grooves formed around the openings 24a, 26a, 28a (30a, 32a, 34a) of the oil passages 24, 26, 28 (30, 32, 34), respectively. Each annular groove shares an arc portion thereof with the adjacent annular groove on each side, and thus the annular grooves are integrated into a single continuous groove. The gasket 35 is formed in a shape corresponding to the shape of the gasket groove 16c (18c). That is, the gasket 35 consists of three ring portions 35a, 35b, 35c. The ring portions 35a, 35b, 35c have arc portions 35g, 35gh, 35i, respectively, each of which is shared between two adjacent ring portions, and thus the ring portions 35a, 35b, 35c are intergraded with each other.

Projections 35d, 35e are formed on the inner side and the outer side of each gasket 35. The distance between the apex of the inner side projection 35d and the apex of the corresponding outer side projection 35e is slightly larger than the width of the gasket groove 16c (18c). Thus, by press-fitting the gasket 35 into the gasket groove 16c, (18c), the gasket 35 can be easily fit in the gasket groove 16c (18c) and the position of the gasket 35 can be fixed by the elastic force of the gasket 35.

Figure 7:
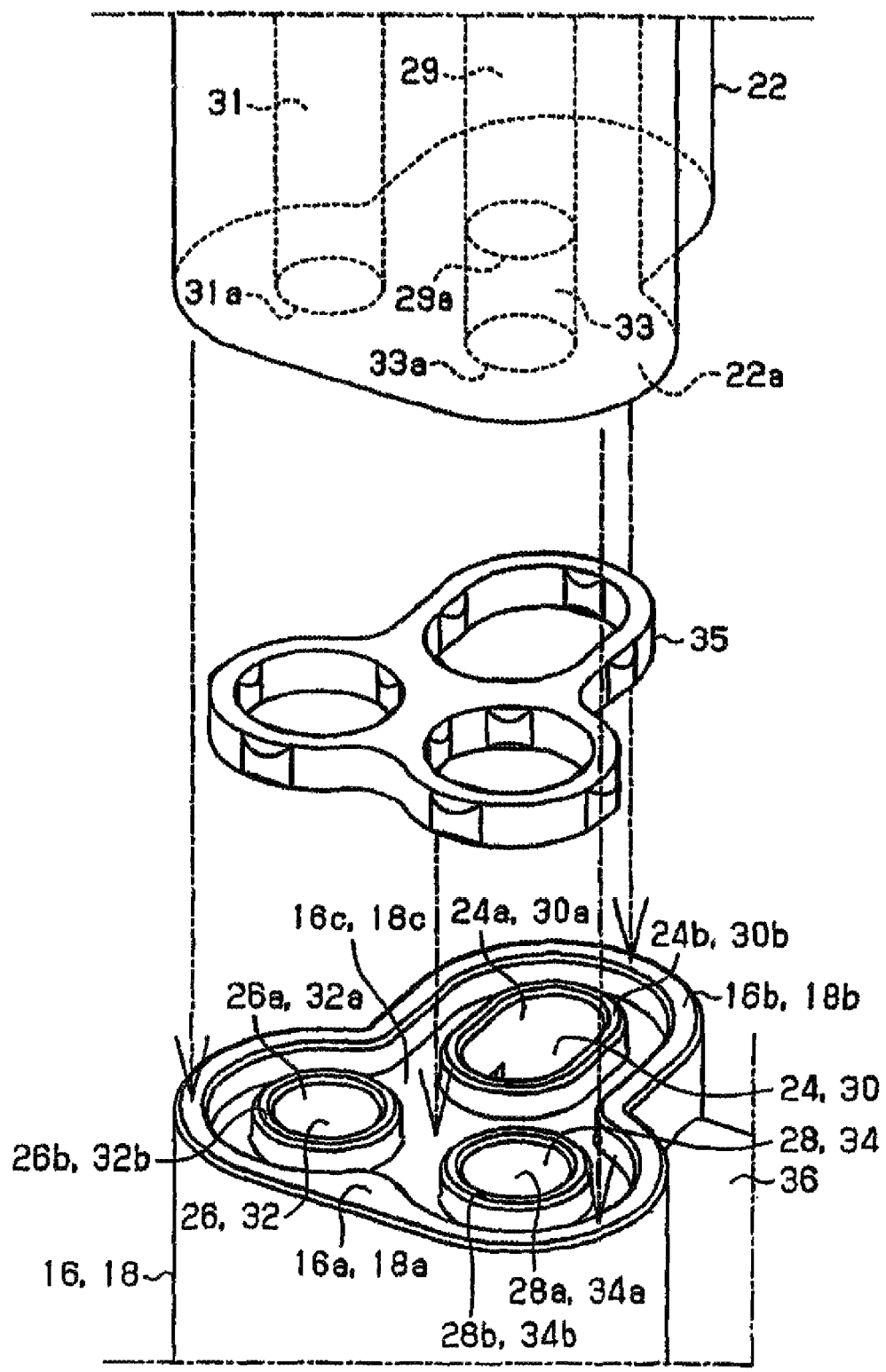
FIG. 7 is a view illustrating a method for assembling the oil passage connection structure of the first exemplary embodiment.

The height of the gasket 35 is about 1.5 times greater than the depth of the gasket groove 16c (18c). The connection portions 16, 18 and the connection portions 22 are connected to each other as follows. Referring to FIG. 7, the gaskets 35 are first put in the gasket grooves 16c, 18c, respectively, and then the cylinder-head-cover-side oil passage connection faces 22a are press-fit to the oil passage connection faces 16a, 18a on the cam cap 2 side, respectively, and the cylinder head cover 20 is then bolted to the cam housing 7 or to the cylinder head. Thus, the cylinder head cover 20 is mounted such that the respective joints between the connection portions 16, 18 and the connection portions 22 of the cylinder head cover 20 are sealed as shown FIG. 4, whereby leakage of hydraulic oil from the same joints is prevented.

A wall portion 36 is integrally formed upright between the exhaust side cam cap portion 4 and the intake side cam cap portion 6 of the cam cap 2. That is, the entire part of the exhaust side cam cap portion 4 including the connection portion 16 and the entire part of the intake side cam cap portion 6 including the connection portion 18 are connected to each other via the wall portion 36. An upper edge portion 36b of the wall portion 36 is cylindrical having a diameter larger than the thickness of the wall portion 36 measured below the upper edge portion 36b. The upper edge portion 36b connects the connection portions 16, 18. Within the upper edge portion 36b is formed a straight hydraulic oil distribution passage 38 that connects the hydraulic oil supply passage 24 in the connection portion 16 and the hydraulic oil supply passage 30 in the connection portion 18. The hydraulic oil distribution passage 38 is formed in a straight shape by casting or drilling. Plugs 38a, 38b are press-fit to the ends of the hydraulic oil distribution passage 38 to prevent leakage of hydraulic oil from the same ends.

In the wall portion 36, a hydraulic oil inlet passage 40 is formed in the vertical direction, which communicates with and perpendicularly intersects the hydraulic oil distribution passage 38. The lower opening of the hydraulic oil inlet passage 40 is formed at a bottom face 2f of the cam cap 2. When the cam cap 2 is mounted on the cam housing 7, hydraulic oil is supplied from the cam housing 7 (or from the cylinder head) into the hydraulic oil inlet passage 40 through the lower opening of the hydraulic oil inlet passage 40. That is, hydraulic oil that has been pressurized up to a given pumping pressure is supplied into the hydraulic oil distribution passage 38 via the hydraulic oil inlet passage 40. Hydraulic oil is then supplied from the hydraulic oil distribution passage 38 to the hydraulic oil supply passages 24, 30 of the connection portions 16, 18. In the first exemplary embodiment, an oil filter is provided at the hydraulic oil inlet passage 40, and the hydraulic oil inlet passage 40 and a peripheral wall portion 40a defining the hydraulic oil inlet passage 40 are formed to be large in diameter, and the upper portion of the hydraulic oil inlet passage 40 and the upper portion of the peripheral wall portion 40a are tapered down upward. Meanwhile, if no oil filter is provided at the hydraulic oil inlet passage 40, the hydraulic oil inlet passage 40 and the peripheral wall portion 40a may be formed such that their diameters coincide with the diameters of the hydraulic oil distribution passage 38 and the upper edge portion 36b, respectively.

With the connection portions 16, 18 of the cam cap 2 connected to the connection portions 22 of the cam cap 2 as shown in FIG. 7, at the connection portions 22 of the cylinder head cover 20, the hydraulic oil supply passages 24, 30 are connected to corresponding hydraulic oil supply passages 29 in the connection portions 22 of the cylinder head cover 20, respectively (Refer to FIG. 4). Note that FIG. 4 shows one of the connection portions 22 of the cylinder head cover 20 only and the structure of the other connection portion 22 is the same as that shown in FIG. 4. Hydraulic oil is supplied from each of the hydraulic oil supply passages 29 to the inlet port of an oil control valve (will be referred to as "OCV") mounted in a mounting hole 42c of a mounting portion 42. Note that FIG. 4 shows a state before the OCVs are mounted in the mounting holes 42c of the mounting portions 42. The OCVs are passage switching valves that are electromagnetically driven. Each OCV has one inlet port, two pressure-adjusting ports, and two discharge (drain) ports. Each OCV has a function of selectively connecting the inlet port to one of the pressure-adjusting ports while connecting the other of the pressure-adjusting ports to a corresponding one of the discharge ports. The pressure-adjusting ports of each OCV are connected to the openings of two pressure-adjusting oil passages 31, 33 (Refer to FIG. 5, FIG. 7) in the mounting hole 42c, and the pressure-adjusting passages 31, 33 are connected to the pressure-adjusting passages of the corresponding connection portion of the cam cap 2 (i.e., the pressure-adjusting passages 26, 28 at the connection portion 16 or the pressure-adjusting passages 32, 34 at the connection portion 18). According to this structure, through the oil passage switching operation of the OCVs, hydraulic oil is selectively supplied to the pressure-adjusting passages 26, 32 or to the pressure-adjusting passages 28, 34.

The two discharge ports of each OCV are connected to discharge holes 42a, 42b at the mounting hole 42c and thus communicate with the space below the cylinder head cover 20. As such, for example, when the inlet ports of the OCVs are selectively connected to the pressure-adjusting passages 26, 32, respectively, and hydraulic oil is supplied into the pressure-adjusting passages 26, 32, hydraulic oil is discharged (drained) from each of the pressure-adjusting passages 28, 34 into the cylinder head cover 20 through the connection portion 22, the OCV, and the corresponding one of the discharge holes 42a, 42b, as indicated by the arrow in FIG. 4. On the other hand, when the inlet ports of the OCVs are connected to the pressure-adjusting passages 28, 34, respectively, and hydraulic oil is supplied into the pressure-adjusting passages 28, 34, hydraulic oil is discharged (drained) from each of the pressure-adjusting passages 26, 32 into the cylinder head cover 20 through the connection portion 22, the OCV, and the corresponding one of the discharge holes 42a, 42b.

Referring to FIG. 1, the lower openings of the pressure-adjusting passages 26, 28 are formed in the camshaft support face 4a, and the lower openings of the pressure-adjusting passages 32, 34 are formed in the camshaft support face 6a. The pressure-adjusting passages 26, 28, 32, 34 are connected to the valve-advance chambers and the valve-retard chambers of variable valve timing mechanisms (will be referred to as "VVTs") 44, 46 (Refer to FIG. 3), respectively, via the plain bearings 12, 14, peripheral grooves 8a, 10a of the camshafts 8, 10, and the pressure-adjusting oil passages 8b, 8c, 10b, 10c formed in the camshafts 8, 10. As such, through the control of the OCVs, hydraulic oil is selectively supplied to the pressure-adjusting oil passages 26, 32 or to the pressure-adjusting oil passages 28, 34, whereby the VVTs 44, 46 are driven to change the rotational phases of the camshafts 8, 10 with respect to the crankshaft and thus advance or retard the operation timing of the intake valves and the exhaust valves as needed. At this time, as mentioned above if hydraulic oil is supplied to the pressure-adjusting oil passages 26, 32, hydraulic oil is discharged from the pressure-adjusting passage 28, 34, and if hydraulic oil is supplied to the pressure-adjusting oil passages 28, 34, hydraulic oil is discharged from the pressure-adjusting passages 26, 32.

Figure 8:
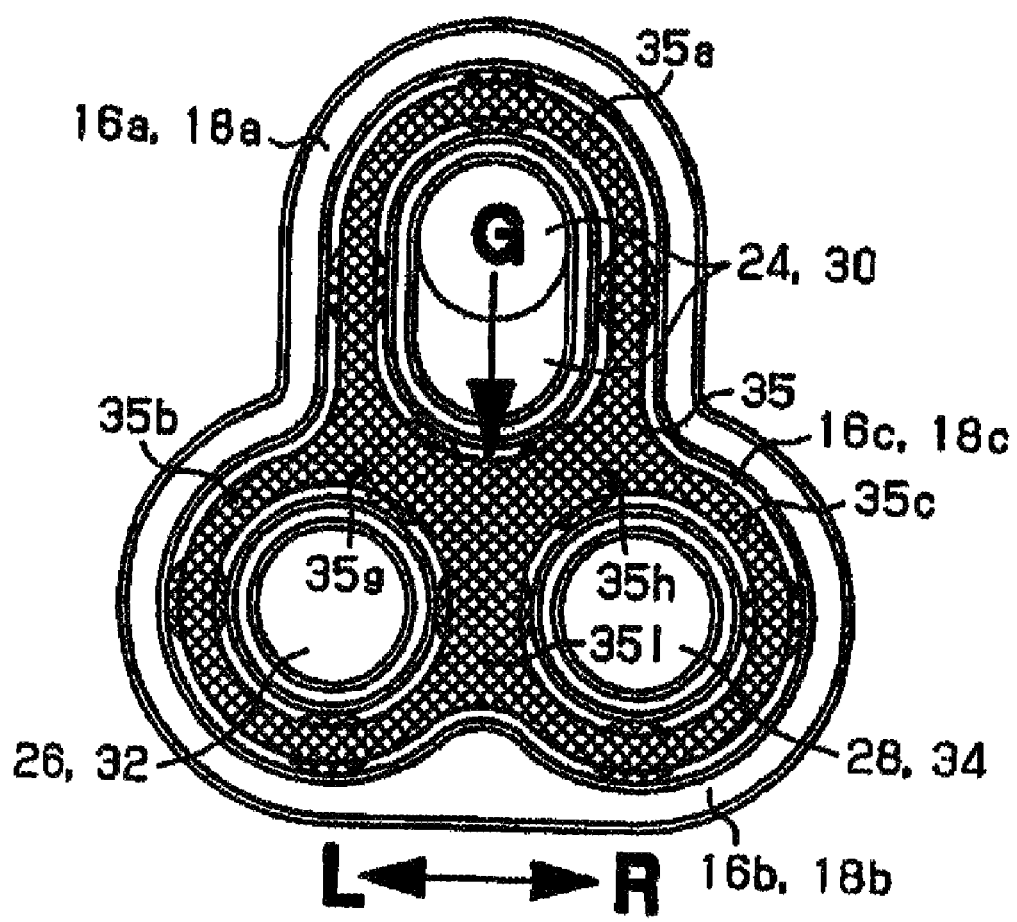
FIG. 8 is a view illustrating the arrangement of the gasket of the first exemplary embodiment.

In such a hydraulic pressure control procedure, the hydraulic pressures in the hydraulic oil supply passages 24, 29, 30 are stably high at the joints between the oil passage connection faces 16a, 18a and the cylinder-head-cover-side oil passage connection faces 22a, at each of which the gasket 35 is disposed. However, the hydraulic pressures in the pressure-adjusting oil passages 26, 28, 31, 32, 33, 34 largely change during the operation of the OCVs. Here, it is assumed that pressure-adjusting oil passages 8b, 10b of the camshafts 8, 10 lead to the valve-advance chambers of the VVTs 44, 46 and pressure-adjusting oil passages 8c, 10c of the camshafts 8, 10 lead to the valve-retard chambers of the VVTs 44, 46. In this case, when the OCVs are operated to advance the valve operation timing, the hydraulic pressures in the pressure-adjusting oil passages 26, 31, 32 increase while the hydraulic pressures in the pressure-adjusting oil passages 28, 33, 34 decrease due to drainage of hydraulic oil. Therefore, at the gasket 35 arranged as shown in FIG. 8 (indicated by the cross-hatching), the pressure in the ring portion 35b sealing the joint between the pressure-adjusting oil passage 26 (32) and the pressure-adjusting oil passage 31 becomes high while the pressure in the ring portion 35c sealing the joint between the pressure-adjusting oil passage 28 (34) and the pressure-adjusting oil passage 33 becomes low. Due to this hydraulic pressure difference, force acts on the arc portion 35i between the ring portion 35b and the ring portion 35c in the direction indicated by the arrow R in FIG. 8.

On the other hand, in the case where the OCVs are operated to retard the valve operation timing, the hydraulic pressures in the pressure-adjusting oil passages 28, 33, 34 increase while the hydraulic pressures in the pressure-adjusting oil passages 26, 31, 32 decrease due to drainage of hydraulic oil. Therefore, the pressure in the ring portion 35b becomes low while the pressure in the ring portion 35c becomes high. Due to this hydraulic pressure difference, force acts on the arc portion 35i between the ring portion 35b and the ring portion 35c in the direction indicated by the arrow L in FIG. 8.

The magnitude and direction of such force arising from the hydraulic pressure difference oscillate in a short time as the OCVs are operated to adjust the valve operation timing as needed. Therefore, vibrating force always acts on the gaskets 35 during the operation of the internal combustion engine.

Referring to FIG. 5B, the openings 24a, 26a, 28a (30a, 32a, 34a) are arranged in the oil passage connection face 16a (18a) such that the opening 24a (30a) of the hydraulic oil supply passage 24 (30) is located on the line M extending through between the opening 26a (32a) and the opening 28a (34a). In the first exemplary embodiment, more specifically, the line M extends through the midpoint between the two openings 26a, 28a (32a, 34a), and the center of the opening 24a (30a) of the hydraulic oil supply passage 24 (30) is located on the line M. Further, the layout of the three openings 24a, 26a, 28a (30a, 32a, 34a) and the shape of the gasket groove 16c (18c) are symmetrical with respect to a plane extending through the line M in the direction perpendicular to the oil passage connection face 16a (18a). Note that the layout of the openings 29a, 31a, 33a in each of the two cylinder-head-cover-side oil passage connection faces 22a is the same as described above.

According to the above-described arrangement, as indicated by the arrow in FIG. 8, stable and strong force G continuously acts, through the arc portions 35g, 35h, on the arc portion 35i from the hydraulic oil supply passage 24 (29, 30) in which the hydraulic pressure is higher and more stable than the hydraulic pressures in the pressure-adjusting oil passages 26, 28 (31, 32, 33, 34). Thus, the arc portion 35i is constantly pressed against the inner wall of a peripheral portion 16b (18b) of the oil passage connection face 16a (18a).

The first exemplary embodiment described above provides the following advantages.

(A) According to the oil passage connection structure described above, the gasket 35 provided in the gasket groove 16c (18C) receives the force that acts in the direction in which the two pressure-adjusting oil passages 26, 28 (32, 34) are aligned in line (i.e., the L-R direction in FIG. 8), and the magnitude and direction of this force change as the difference between the hydraulic pressures in the pressure-adjusting oil passages 26, 28 (32, 34) varies. However, because the opening of the hydraulic oil supply passage 24 (30) that is the hydraulic pressure source for the pressure-adjusting control by the OCV is located on the line M extending through between the openings 26a, 28a (32a, 34a) of the two pressure-adjusting oil passages 26, 28 (32, 34), the effect of the hydraulic pressure in the hydraulic oil supply passage 24 (30) on the gasket 35 is strongest and stable.

Therefore, the gasket 35 is constantly pressed by the force G against the portions of the side faces of the gasket groove 16c (18c) each facing the opening 24a (30a) of the hydraulic oil supply passage 24 (30) under the pressure exerted from the hydraulic oil supply passage 24 (30) in the direction substantially perpendicular to the direction in which the openings 26a, 28a (32a, 34a) of the pressure-adjusting oil passages 26, 28 (32, 34) are aligned in line. As such, constant and large frictional force occurs between the gasket 35 and the aforementioned side faces of the gasket groove 16c (18c), whereby the gasket 35 is firmly retained in the gasket groove 16c (18c).

This structure suppresses the vibration of the gasket 35 in the gasket groove 16c (18c) that occurs as the hydraulic pressure difference between the pressure-adjusting oil passages 26, 28 (32, 34) varies. Thus, wear of the gasket 35 can be minimized.

(B) According to the structure of the first exemplary embodiment described above, the gasket groove 16c (18c) surrounding the three openings 24a, 26a, 28a, (30a, 32a, 34a) is formed as a single grove, being constituted of the ring portions 35a, 35b, 35c having the arc portions 35g, 35h, 35i, respectively, each of which is shared between two adjacent ring portions. Namely, as shown in FIG. 6, the ring portions 35a, 35b, 35c are integrated into the single gasket 35 via the arc portions 35g, 35h, 35i, and the single gasket 35 is provided in the gasket groove 16c (18c) to seal all the three openings 24a, 26a, 28a (30a, 32a, 34a). Therefore, the hydraulically produced force G is reliably transferred from the ring portion 35a surrounding the opening 24a (30a) of the hydraulic oil supply passage 24 (30) to the ring portions 35b, 35c, whereby the effect of suppressing the vibration of the gasket 35 is enhanced.

(C) Because the structure around the oil passage connection faces 16a, 18a of the cam cap 2 according to the first exemplary embodiment is not complicated and large in size, even if the cam cap portions 4, 6 are integrated with each other, the connection portions 16, 18 can be easily formed on the cam cap portions 4, 6, respectively. At each connection portion 16, 18 thus formed, as described above, the vibration of the gasket 35 that occurs as the hydraulic pressure difference between the pressure-adjusting oil passages 26, 28 (32, 34) varies can be suppressed.

(D) According to the oil passage connection structure of the first exemplary embodiment, the cylinder-head-cover-side oil passage connection faces 22a formed at the connection portions 22 of the cylinder head cover 20 that are connected to the connection portions 16, 18 of the cam cap 2, respectively, are flat and no gasket grooves are formed in the cylinder-head-cover-side oil passage connection faces 22a.

If gasket grooves are formed in the cylinder-head-cover-side oil passage connection faces 22a as in the connection portions 16, 18 of the cam cap 2, a need may arise to machine the cylinder-head-cover-side oil passage connection faces 22a so as to achieve sufficient positional accuracy and flatness of each cylinder-head-cover-side oil passage connection face 22a. In this case, the depth of the gasket groove formed in each cylinder-head-cover-side oil passage connection face 22a tends to be insufficient or non-uniform. Especially, because the entire part of the cylinder head cover 20 is thin, the cylinder head cover 20 tends to deform when it is manufactured by injection molding, or the like. As such, the finishing process for each gasket groove in the cylinder-head-cover-side oil passage connection face 22a is likely to end up with insufficient or non-uniform depth of the cylinder-head-cover-side oil passage connection face 22a, reducing the manufacturing yields.

On the other hand, being small in size and having a relatively large thickness, the cam cap 2 is unlikely to deform when it is manufactured by casting, or the like. Therefore, the desired depth and shape of each gasket groove 16c, 18c of the cam cap 2 can be maintained even after finishing the oil passage connection faces 16a, 18a. Further, the cam cap 2 may be finished by using the oil passage connection faces 16a, 18a as a reference plane. In this case, the depth of the gasket grooves 16c, 18c is not influenced by the finishing process.

Thus, according to the first exemplary embodiment, it is possible to more effectively suppress the vibration of the gasket 35 and thus minimize wear of the gasket 35, as well as improving the manufacturing yields.

Other Exemplary Embodiments (a) While the single cam cap is formed to serve as both a cam cap for the intake camshaft and a cam cap for the exhaust camshaft in the first exemplary embodiment described above, two separate intake and exhaust earn caps may alternatively be used and the connection portion described in the first exemplary embodiment may be formed on each of the separate cam caps.

Further, even when a cam cap serving as both a cam cap for the intake camshaft and a cam cap for the exhaust camshaft is used, the cam cap may be formed such that the connection portion described in the first exemplary embodiment is provided on only one side of the cam cap.

In any of the above cases, the foregoing advantages (A), (B), (D) obtained in the first exemplary embodiment can be obtained.

Figure 9:
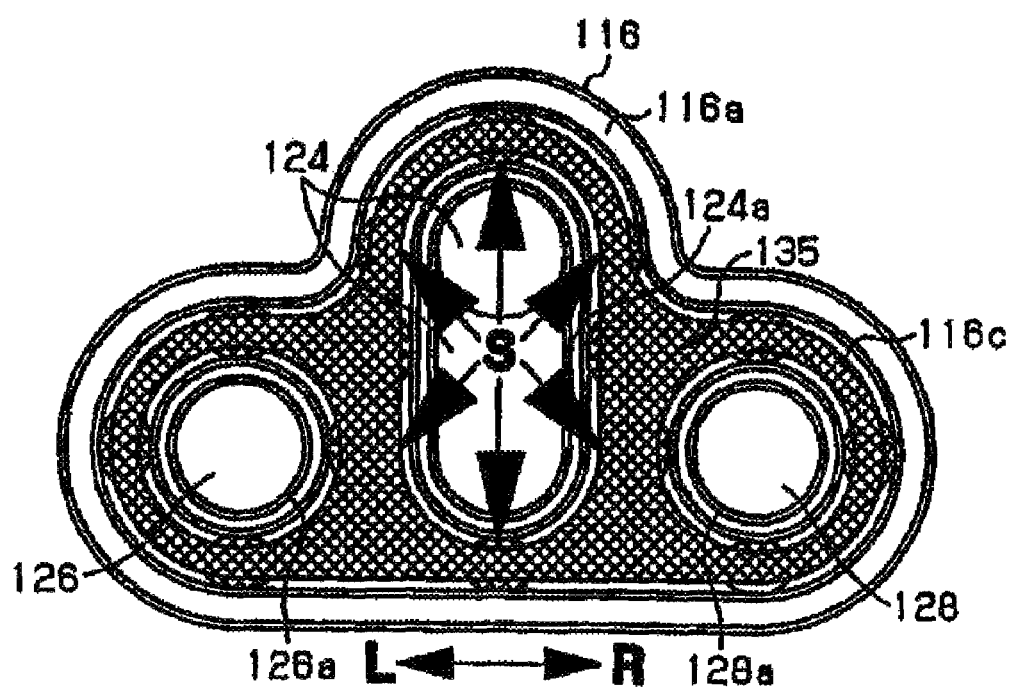
FIG. 9 is a view showing the structure of another exemplary oil passage connection structure according to the invention.

(b) Instead of the oil passage connection structure shown in FIG. 8, the oil passage connection structure shown in FIG. 9 may be incorporated in which an opening 124a of a hydraulic oil supply passage 124 is located between openings 126a, 128a of hydraulic oil supply passages 126, 128 in an oil passage connection face 116a of a connection portion 116 of the cam cap. In this case, the corresponding oil passage connection face of the cylinder head cover is flat and has the same opening arrangement as shown in FIG. 9, and the shapes of the openings are the same as shown in FIG. 9.

According to this structure, stable and large force S produced by the hydraulic pressure in the hydraulic oil supply passage 124 produces frictional force that retains a gasket 135 (indicated by the cross-hatching in FIG. 9) in a gasket groove 116c, and therefore the vibration of the gasket 135 (vibration in the L-R direction shown in FIG. 9) is suppressed and thus wear of the gasket 135 is minimized.

While the invention has been described with reference to the example embodiment thereof, it is to be understood that the invention is not limited to the example embodiment and construction. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

The invention claimed is:

1. A cam cap for an internal combustion engine, having a connection portion protruding from a side of the cam cap opposite to where a camshaft support face is formed, characterized in that:
    an opening of a hydraulic oil supply passage through which hydraulic oil is supplied to an oil control valve and openings of two pressure-adjusting oil passages each of which supplies and receives hydraulic oil at a pressure adjusted by the oil control valve are formed in an oil passage connection face of the connection portion such that the opening of the hydraulic oil supply passage is located on an imaginary line extending through between the openings of the two pressure-adjusting oil passages; and
    a gasket groove is formed as a single continuous groove so as to surround the opening of the hydraulic oil supply passage and the openings of the two pressure-adjusting oil passages,
    wherein the layout of the opening of the hydraulic oil supply passage and the openings of the two pressure-adjusting oil passages and the shape of the gasket groove are symmetrical with respect to a plane extending through the imaginary line in a direction perpendicular to the oil passage connection face.

2. The cam cap according to claim 1, wherein
the gasket groove is constituted of annular grooves surrounding the opening of the hydraulic oil supply passage and the openings of the two pressure-adjusting oil passages, respectively, the annular grooves being integrated into a single continuous groove of arc portions of each of the annular grooves being shared by two adjacent annular grooves.

3. The cam cap according to claim 1, wherein
in the oil passage connection face of the connection portion, the center of the opening of the hydraulic oil supply passage is located on an imaginary line extending through the midpoint between the openings of the two pressure-adjusting oil passages.

4. The cam cap according to claim 1, wherein
the cam cap has a earn cap portion for an intake camshaft and a cam cap portion for an exhaust camshaft, and
each of the cam cap portions has a connection portion.

5. The cam cap according to claim 1, wherein
a portion of the opening of the hydraulic oil supply passage is located between the openings of the two pressure-adjusting oil passages.

6. An oil passage connection structure, comprising:
a cam cap according to claim 1; and
a gasket that is integrally formed in a shape corresponding to the shape of the gasket groove and arranged in the gasket grove so as to surround the opening of the hydraulic oil supply passage and the openings of the two pressure-adjusting oil passages.

7. The oil passage connection structure according to claim 6, wherein the cylinder-head-cover-side oil passage connection face is flat.

* * * * *